358-69. OR 2,896,017 SR

SEARCH ROOM

T 6532

July 21, 1959 M. E. PARTIN 2,896,017

DUAL-BEAM CATHODE RAY TUBE SYSTEM

Filed Nov. 28, 1956 2 Sheets-Sheet 1

INVENTOR.
MELVIN E. PARTIN
BY
ATTORNEY

DUAL-BEAM CATHODE RAY TUBE SYSTEM

Filed Nov. 28, 1956 2 Sheets-Sheet 2

INVENTOR.
MELVIN E. PARTIN
BY
[signature]
ATTORNEY

United States Patent Office 2,896,017

Patented July 21, 1959

2,896,017

DUAL-BEAM CATHODE RAY TUBE SYSTEM

Melvin E. Partin, Philadelphia, Pa., assignor to Philco Corporation, Philadelphia, Pa., a corporation of Pennsylvania Application November 28, 1956, Serial No. 624,780

14 Claims. (Cl. 178—5.4)

This invention relates to cathode ray tube systems, and more particularly to such systems wherein a dual-beam cathode ray tube is employed having indexing elements on its screen for generating an indexing signal in response to electron impingement on said elements. In such a system, one electron beam is the image-producing beam and the other is the indexing beam, and the indexing signal is utilized to effect coordination between the position of the image-producing beam and the modulation of that beam.

While this invention is intended to be applicable to any such cathode ray tube system, the invention is particularly applicable to a color television receiver employing such a cathode ray tube system.

In such a color television receiver, the image-producing beam is modulated with the picture intelligence, and the screen of the cathode ray tube is provided with light-emissive elements which emit light of different colors in response to impingement of the image-producing beam on said elements, thereby to produce the color image on said screen. The screen is also provided with indexing elements which are adapted to produce an indexing signal in response to impingement of the indexing beam on the indexing elements, which signal is utilized to effect coordination between the color components of the color video signal and the position of the image-producing beam, this being essential to proper color rendition in the reproduced image. In the preferred form of such a cathode ray tube, the elements emissive of light of different colors are in the form of vertical phosphor stripes arranged in triplets, each triplet successively producing light of the different primary colors as the image-producing beam moves transversely of the stripes and impinges them in succession. The indexing elements may be in the form of spaced vertical stripes positionally related to said triplets and adapted to emit radiant energy in response to electron impingement, such energy being received by a collector to produce the desired indexing signal.

In a system of this character, the radiant energy emitted by the indexing elements may take different forms. For example, the indexing elements may emit secondary electrons to generate the indexing signal, or the said elements may emit light to generate the signal.

In such a system, the principal purpose of using two electron beams is to segregate the image-producing and indexing functions, and to avoid video contamination of the indexing signal. This purpose is better served if the intensity of the indexing beam is varied at a pilot carrier rate which is widely different from the rate at which the intensity of the image-producing beam is varied by the video signal. In such a system, the signal produced by the traversal of the indexing stripes by the indexing beam comprises a carrier component at the pilot carrier frequency and sideband components representing the sum and difference of the pilot carrier frequency and the rate of traversal of the indexing stripes. Either of the sideband components may be used as the indexing signal. This is well understood in the art and is described in my prior U.S. Patent No. 2,742,531 issued April 17, 1956.

Even in such a system, however, a problem has existed due to the fact that the image-producing beam necessarily traverses the indexing stripes; and the problem is particularly pronounced where the indexing stripes are of a character to emit light and a photo-multiplier or photo-tube is employed to receive the emitted light. Thus, in such a system, the light output from the indexing stripes due to the image-producing beam may be so great as to obscure the indexing signal.

The principal object of the present invention is to overcome this objection, and to provide a dual beam system wherein the indexing signal does not suffer from the inevitable emission of radiant energy by the indexing elements due to traversal thereof by the image-producing beam.

This invention is based on the concept of time segregation of the energy outputs of the indexing elements due respectively to the impingements of the indexing and image-producing beams, and utilization of such time segregation to effect a gating action so as to derive a distinct and uncontaminated indexing signal.

In accordance with this invention, a dual beam cathode ray tube system is provided wherein the two beams are spaced apart, in the direction of line scanning, a predetermined distance different from the spacing of the indexing elements so as to effect time segregation of the energy outputs of the indexing elements due respectively to the impingements of the two beams, and provision is made for effectively time gating the outputs so as to derive an indexing signal substantially entirely from the energy output due to impingement of the indexing beam on the indexing elements.

Since the invention is particularly applicable to a color television receiver, it will be described with reference to such application. However, it is to be understood that no limitation of the invention is thereby intended.

The invention may be fully understood by reference to the accompanying drawings, wherein.

Figure 1:
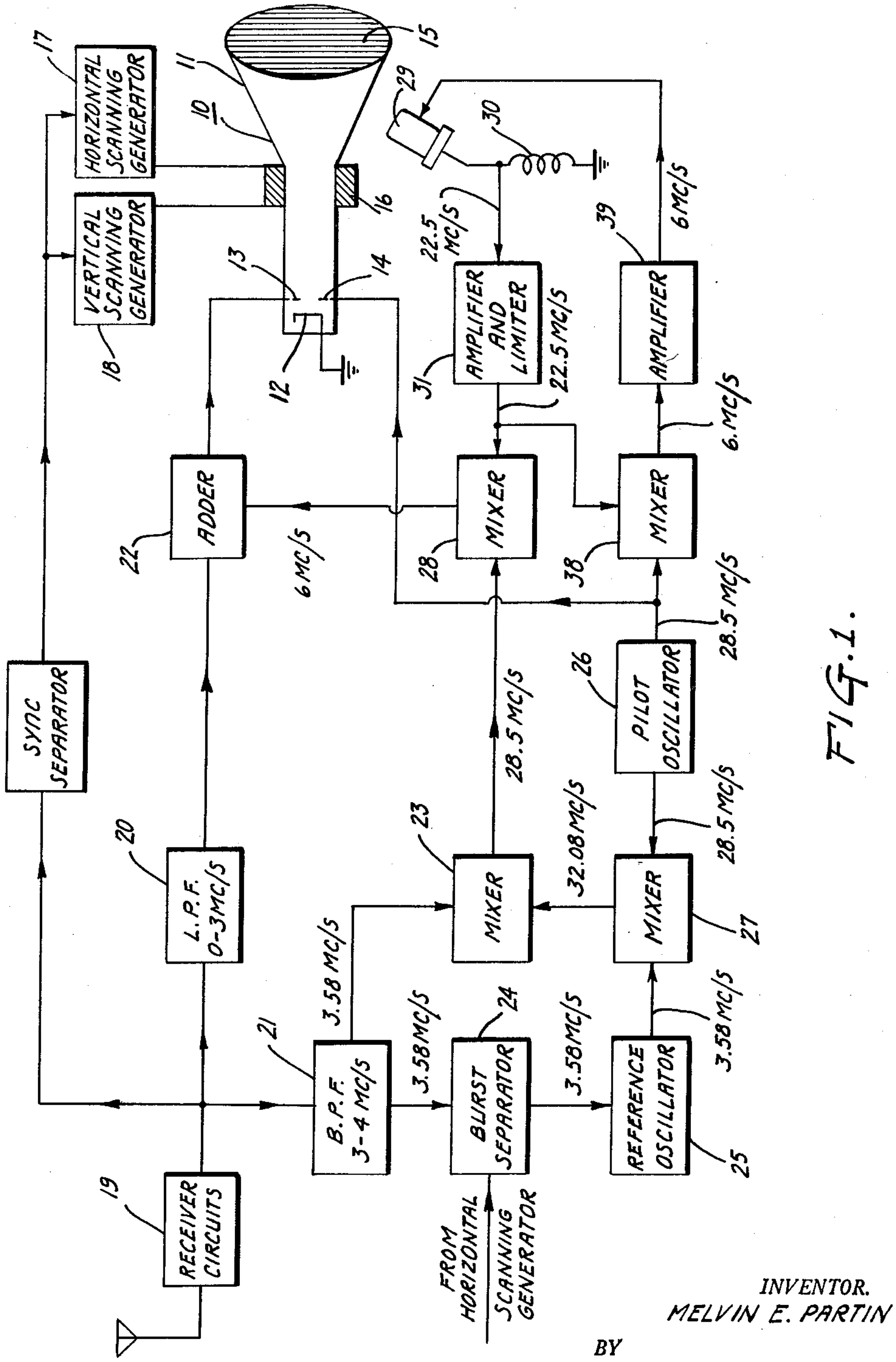
Fig. 1 is a block diagram of a color television receiver embodying the present invention.

Referring first to Fig. 1, the color television receiver illustrated comprises a cathode ray tube 10 containing within an evacuated envelope 11 a dual beam generating and intensity control structure including a cathode 12 and control electrodes 13 and 14. This structure may be of the physical character disclosed in U.S. Patent No. 2,712,087 issued June 28, 1955 to W. L. Fite et al. The screen of the cathode ray tube, which may be arranged on or adjacent to the end face 15 of the tube, preferably comprises phosphor stripes and indexing stripes, as hereinbefore mentioned. For simplicity, the elements of the cathode ray tube other than those mentioned above are not shown, as they are not essential to a description of the present invention.

The deflection yoke 16, which is connected to the horizontal and vertical scanning circuits 17 and 18, serves to deflect the two electron beams in unison across the screen of the tube, as well understood in the art. During the scanning motion of the two beams, the image-producing beam is under control of the control electrode 13, and the indexing beam is under control of the control electrode 14.

For supplying a color video signal to the control electrode 13, there are provided within block 19 the usual receiver circuits which may include the usual radio frequency amplifier, frequency conversion and detector stages for producing a color video signal. As well understood, the color signal comprises brightness and chromaticity components, and a reference signal usually in the form of a color burst. In the receiver illustrated, the color video signal is separated into its brightness and chromaticity components by means of a low pass filter 20 and a bandpass filter 21. The brightness signal is supplied to the control electrode 13 of the cathode ray tube 10 through an adder 22 having two inputs and a common output. The chromaticity information, derived from the bandpass filter 21, is supplied to a heterodyne mixer 23, and is ultimately supplied to the control electrode 13 of the cathode ray tube through the adder 22, as hereinafter described.

The burst separator 24 operates to separate the burst from the color video wave by providing a gated path for the applied input signal during the time of occurrence of the burst. As well understood, the gating action of the burst separator may be effected by means of pulses derived from the output of the horizontal scanning generator. The separated burst is applied to the reference oscillator 25 which is adapted to generate a signal having a frequency and a phase as established by the frequency and phase of the burst.

In the system illustrated, a pilot oscillator 26 is employed, as in the system shown in the aforementioned patent. The output of this oscillator is supplied to the control electrode 14 of the cathode ray tube 10, and is also supplied to the heterodyne mixer 27 which also receives the reference signal from the reference oscillator 25. The signal output of mixer 27, which is phased according to the reference signal from oscillator 25, is supplied to the mixer 23. The output of mixer 23 comprises the chromaticity information phased according to the reference signal.

In the system illustrated, the coordination between the modulation and position of the image-producing beam is effected by controlling the phase of the color video wave according to frequency variations of the indexing signal. To this end, the output of mixer 23 is supplied to a mixer 28, to which there is also supplied the indexing signal produced by the indexing system presently to be described. The output of mixer 28 is supplied to the adder 22. The output of mixer 28 is a color video wave whose phase is determined by the phase of the chromaticity information and by the phase of the reference signal derived from oscillator 25, and also by the indexing signal derived by the scanning of the indexing stripes within the cathode ray tube 10.

In the system illustrated, the indexing elements on the screen of the cathode ray tube 10 are adapted to emit light in response to electron impingement, and a photomultiplier or phototube 29 is arranged to receive the light and serves to produce the indexing signal across a coil 30. As previously mentioned, the signal produced by the scanning of the indexing elements by the indexing beam comprises a carrier component at the pilot carrier frequency and sideband components representing the sum and difference of the pilot carrier frequency and the rate of traversal of the indexing elements. In this instance the pilot carrier frequency is 28.5 mc./s. and the scanning rate is assumed to be 6 mc./s. The lower sideband, having a nominal frequency of 22.5 mc./s., is used and is supplied through the amplifier 31 to the mixer 28.

As previously mentioned, in a system of this character the traversal of the indexing elements by the image-producing beam causes deleterious light output from the indexing elements, and the purpose of the present invention is to overcome this objection. This is accomplished by time segregation and gating as hereinbefore mentioned.

Figure 2:
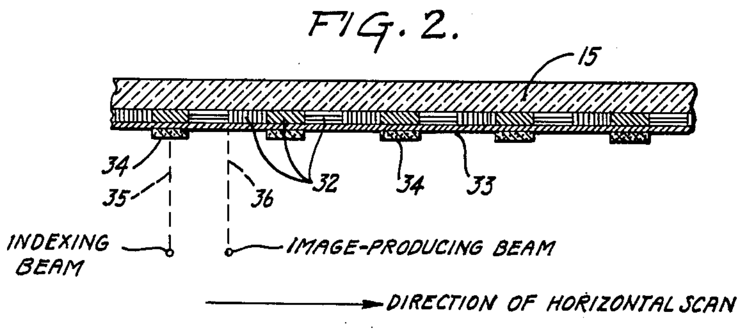
Figs. 2 and 3 are explanatory illustrations showing how the present invention achieves its desired purpose.

Referring now to Fig. 2, there is shown in horizontal section a portion of a possible form of the screen of the cathode ray tube. Such structure comprises color phosphor stripes 32 applied to faceplate 15 of the cathode ray tube, an electron-permeable layer 33 which may be in the form of an aluminum film applied to the rear of the phosphor stripes and serving as a light-reflective backing therefor, and indexing stripes 34 applied to and supported by the layer 33. A screen structure of this general character is fully described in a copending application of C. Bocciarelli, Serial No. 198,709, filed December 1, 1950, which also discloses other usable screen structures. The phosphor stripes are arranged in triplets, the stripes of each triplet being emissive respectively of red, green and blue light. The indexing stripes are arranged in predetermined positional relationship to the color triplets; for example, there may be one indexing stripe for each triplet, and the indexing stripes may be aligned with the phosphor stripes emissive of light of a particular color such as green. In the illustrated system, the indexing stripes are composed of a fluorescent material, such as zinc oxide, emissive of invisible light to be received by the phototube 29 in Fig. 1.

In accordance with this invention, the indexing and image-producing beams, represented at 35 and 36 in Fig. 2, are spaced apart, in the direction of line scanning, a predetermined distance which differs from the spacing of the indexing elements 34, said distance preferably being one-half the spacing of the indexing elements. As previously stated, the structure for producing the two beams may be of the character shown in the aforementioned Fite et al. patent. In that structure, the two beams are produced and controlled by two apertured electrodes. The spacing of the beams according to this invention may be provided simply by appropriate positioning of said electrodes so that their apertures are spaced apart the desired distance in the direction of line scanning. It is immaterial whether the beams are aligned in the direction of line scanning, so long as they are spaced in that direction according to this invention. Thus where horizontal line scanning is employed, the beams may be spaced vertically as well as horizontally, so long as the horizontal spacing is according to this invention.

Figure 3:
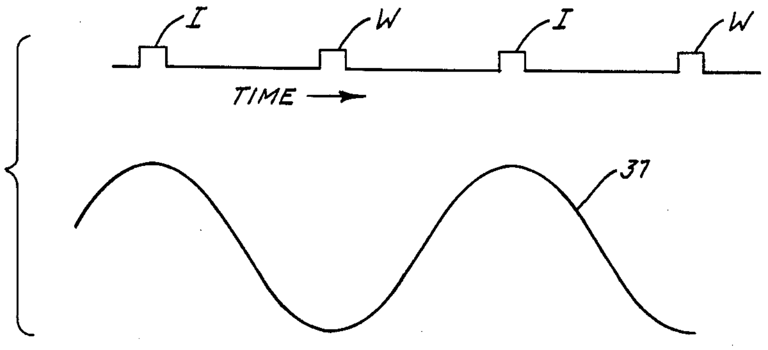

As the two beams move in unison, they successively impinge each indexing stripe and cause emission of light which is received by the phototube. As the light emission occurs in pulses, the phototube normally would produce current pulses as represented in Fig. 3 on an exaggerated time scale. Thus the indexing beam causes time-spaced pulses I and the image-producing beam normally would cause time-spaced pulses W which occur during the time intervals between the pulses I. Thus the spacing of the two beams effects time segregation of the energy outputs caused by the respective beams.

Further in accordance with this invention, the undesired current pulses W are effectively suppressed or caused to be non-existent by a gating action according to a gating waveform such as represented at 37 in Fig. 3. It will be noted that in this instance the frequency of the gating waveform corresponds to the rate of traversal of the indexing elements, and the gating waveform is properly phased to effect the suppression of the undesired current pulses W.

In the system of Fig. 1, the gating is effected in the photo-multiplier or phototube 29. In this system, the output of the amplifier and limiter 31 is supplied to a mixer 38, to which the output of the pilot oscillator 26 is also supplied. The output of mixer 38 is supplied through an amplifier 39 to the phototube 29 to control the gain thereof.

In the illustrated system, the rate of scanning of the indexing elements is 6 mc./s., and by the arrangement shown a properly phased gating wave having the same frequency is derived from mixer 38 and is utilized to control the phototube so as to increase its gain during the occurrence of the light pulses caused by the indexing beam and to decrease its gain during the light pulses caused by the image-producing beam. In this manner, the undesired current pulses W in Fig. 3 are effectively suppressed or caused to be non-existent.

From the foregoing description, it will be apparent that any spacing of the two beams, in the direction of line scanning, may be used so long as it is different from the spacing of the indexing elements. It will also be apparent that the gating wave may have any frequency which will effect the selective suppression of the undesired current pulses.

While the system above described utilizes a photoelectric arrangement wherein the indexing elements emit light and the indexing signal is produced by light-responsive means, the present invention is applicable to any other type of indexing system such as that employing secondary electron emission. Thus where the indexing elements emit secondary electrons which are received by a collector electrode to produce current pulses, a gating wave may be produced in the manner shown in Fig. 1, and this wave may be utilized to gate the pulses so as to suppress the undesired pulses caused by the image-producing beam. In such a system it is merely necessary to provide means, such as an electron multiplier, capable of gate operation under control of the gating wave.

Figures 4, 5:
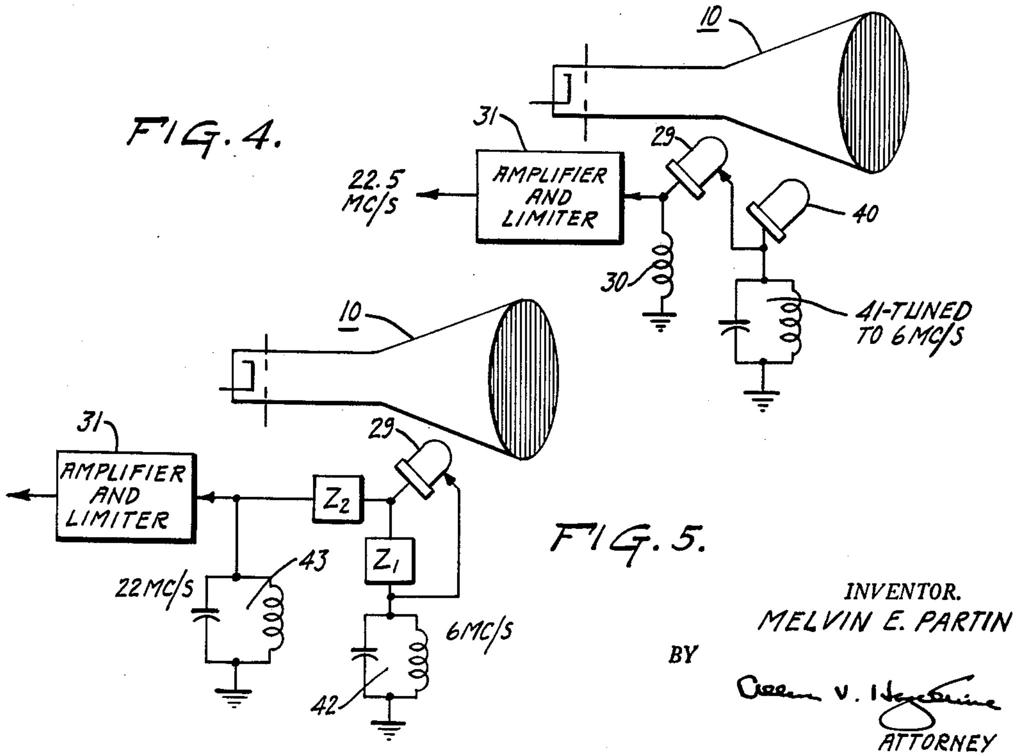
Figs. 4 and 5 show modifications of the system of Fig. 1.

Fig. 4 shows a modification of the system of Fig. 1 in respect to the production of the gating wave. In this instance, instead of employing the mixer 38 and the amplifier 39 of Fig. 1, a second phototube 40 and an associated tuned circuit 41 are employed, the circuit 41 being tuned to a frequency corresponding to the rate of scanning of the indexing elements, e.g., 6 mc./s. The voltage wave produced across the tuned circuit is applied to the phototube 29 to effect the desired gating action.

Fig. 5 shows another modification of the system of Fig. 1 in respect to the production of the gating wave. In this instance, a single phototube is employed, and the gating voltage is derived from across the tuned circuit 42 and is applied to the phototube to control its gain. The indexing signal is derived from across the tuned circuit 43 and is supplied to the amplifier 31. If desired, impedances $Z_1$ and $Z_2$ may also be employed, $Z_1$ presenting high impedance to the indexing signal, and $Z_2$ presenting high impedance to the gating signal.

It should be noted that the modifications of Figs. 4 and 5 are also applicable to a system employing secondary electron emission. In other words, in such a system the gating wave for the purpose of this invention may be produced by means of a tuned circuit, employing either a separate collector or a common collector as in Figs. 4 and 5.

While the invention has been described with reference to its application to a color television receiver, and while a certain embodiment and modifications have been described, the invention is not limited thereto but contemplates such other applications and embodiments as may occur to those skilled in the art.

I claim:

1. In a cathode ray tube system, a dual-beam cathode ray tube having a screen with spaced indexing elements thereon which emit radiant energy in response to electron impingement thereon, means for effecting line scanning of said screen by the two electron beams within said tube, one beam being the image-producing beam and the other being the indexing beam, the two beams being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for producing current pulses in response to energy pulses emitted by said indexing elements, and means for effecting gate operation of said last means so as to produce an indexing signal from the pulses caused by said indexing beam substantially to the exclusion of the pulses caused by said image-producing beam.

2. In a cathode ray tube system, a dual-beam cathode ray tube having a screen with spaced indexing elements thereon which emit radiant energy in response to electron impingement thereon, means for effecting line scanning of said screen by the two electron beams within said tube, one beam being the image-producing beam and the other being the indexing beam, the two beams being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for receiving energy emitted by said indexing elements and for producing a signal, means for producing a gating wave having portions of different amplitudes time-coincident with the energy pulses caused by the indexing beam and the energy pulses caused by the image-producing beam, and means for utilizing said wave to render said signal-producing means substantially non-responsive to the energy pulses caused by said image-producing beam, whereby said signal is produced substantially entirely from the energy emission by said indexing elements caused by said indexing beam.

3. In a cathode ray tube system, a dual-beam cathode ray tube having a screen with spaced indexing elements thereon which emit radiant energy in response to electron impingement thereon, means for effecting line scanning of said screen by the two electron beams within said tube, one beam being the image-producing beam and the other being the indexing beam, means for varying the intensity of the indexing beam at a pilot carrier frequency, the two beams being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for producing current pulses in response to energy pulses emitted by said indexing elements, and means for effecting gate operation of said last means so as to produce an indexing signal from the pulses caused by said indexing beam substantially to the exclusion of the pulses caused by said image-producing beam.

4. In a cathode ray tube system, a dual-beam cathode ray tube having a screen with spaced indexing elements thereon which emit radiant energy in response to electron impingement thereon, means for effecting line scanning of said screen by the two electron beams within said tube, one beam being the image-producing beam and the other being the indexing beam, means for varying the intensity of the indexing beam at a pilot carrier frequency, the two beams being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for receiving energy emitted by said indexing elements and for producing a signal, means for producing a gating wave having portions of different amplitudes time-coincident with the energy pulses caused by the indexing beam and the energy pulses caused by the image-producing beam, and means for utilizing said wave to render said signal-producing means substantially non-responsive to the energy pulses caused by said image-producing beam, whereby said signal is produced substantially entirely from the energy emission by said indexing elements caused by said indexing beam.

5. In a cathode ray tube system, a dual-beam cathode ray tube having a screen with spaced indexing elements thereon which emit light in response to electron impingement thereon, means for effecting line scanning of said screen by the two electron beams within said tube, one beam being the image-producing beam and the other being the indexing beam, the two beams being spaced apart, in the direction of line scanning, a predetermined distance different from the spacing of said indexing elements, whereby time-spaced pulses of light are emitted by said indexing elements, and the light pulses caused by the image-producing beam impinging on said indexing elements occur during the time intervals between the light pulses caused by the indexing beam, photoelectric means for receiving light emitted by said indexing elements and for producing an indexing signal, means for producing a gating wave having portions of different amplitudes time-coincident with the light pulses caused by the indexing beam and the light pulses caused by the image-producing beam, and means for applying said wave to said photoelectric means so as to render the latter substantially non-responsive to the light pulses produced by said image-producing beam, whereby said indexing signal is produced substantially entirely from the light emission by said indexing elements caused by said indexing beam.

6. A cathode ray tube system according to claim 5, further including means for varying the intensity of said indexing beam at a pilot carrier frequency.

7. A cathode ray tube system according to claim 6, wherein the indexing signal is a sideband modulation product of the pilot carrier frequency and the rate of scanning of the indexing elements, and wherein means are provided to effect heterodyne mixing of the pilot carrier and the indexing signal to produce the gating wave.

8. A cathode ray tube system according to claim 6, wherein the indexing signal is a sideband modulation product of the pilot carrier frequency and the rate of scanning of the indexing elements, and wherein a resonant circuit is provided to produce the gating wave, said circuit being tuned to a frequency corresponding to said scanning rate.

9. In a color television receiver, a dual-beam cathode ray tube including a screen having successive elements thereon emissive of light of different colors in response to electron impingement and also having spaced indexing elements thereon which emit radiant energy in response to electron impingement thereon, one of the electron beams within said tube being the image-producing beam whose intensity is varied according to the picture information, and the other beam being the indexing beam, means for effecting line scanning of said screen by the two beams, the latter being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for producing current pulses in response to energy pulses emitted by said indexing elements, and means for effecting gate operation of said last means so as to produce an indexing signal from the pulses caused by said indexing beam substantially to the exclusion of the pulses caused by said image-producing beam.

10. In a color television receiver, a dual-beam cathode ray tube including a screen having successive elements thereon emissive of light of different colors in response to electron impingement and also having spaced indexing elements thereon which emit radiant energy in response to electron impingement thereon, one of the electron beams within said tube being the image-producing beam whose intensity is varied according to the picture information, and the other being the indexing beam, means for effecting line scanning of said screen by the two beams, the latter being spaced apart, in the direction of line scanning, a predetermined distance different from the spacing of said indexing elements, whereby time-spaced pulses of energy are emitted by said indexing elements, and the energy pulses caused by the image-producing beam occur during the time intervals between the energy pulses caused by the indexing beam, means for receiving energy emitted by said indexing elements and for producing a signal, means for producing a gating wave having portions of different amplitudes time-coincident with the energy pulses caused by the indexing beam and the energy pulses caused by the image-producing beam, and means for utilizing said wave to render said signal-producing means substantially non-responsive to the energy pulses caused by said image-producing beam, whereby said signal is produced substantially entirely from the energy emission by said indexing elements caused by said indexing beam.

11. A color television receiver according to claim 10, wherein the elements on the screen of said cathode ray tube are in the form of stripes arranged transversely to the direction of line scanning.

12. A color television receiver according to claim 10, further including means for varying the intensity of said indexing beam at a pilot carrier frequency.

13. A color television receiver according to claim 12, wherein the indexing signal is a sideband modulation product of the pilot carrier frequency and the rate of scanning of the indexing elements, and wherein means are provided to effect heterodyne mixing of the pilot carrier and the indexing signal to produce the gating wave.

14. A color television receiver according to claim 12, wherein the indexing signal is a sideband modulation product of the pilot carrier frequency and the rate of scanning of the indexing elements, and wherein a resonant circuit is provided to produce the gating wave, said circuit being tuned to a frequency corresponding to said scanning rate.

References Cited in the file of this patent

UNITED STATES PATENTS

| | | |
|---|---|---|
| 2,742,531 | Partin | Apr. 17, 1956 |
| 2,759,042 | Partin | Aug. 14, 1956 |
| 2,772,324 | Boothroyd | Nov. 27, 1956 |
| 2,782,252 | Fedde | Feb. 19, 1957 |